United States Patent [19]
Stone et al.

[11] Patent Number: 5,594,513
[45] Date of Patent: Jan. 14, 1997

[54] SYSTEM FOR MOTION PICTURE FILM PREVIEWING

[76] Inventors: Neil T. Stone, 9323 Rowell Ave., Chatsworth, Calif. 91311; Jacques Nosco, 5805 Salisbury La., San Luis Obispo, Calif. 93401

[21] Appl. No.: 440,342

[22] Filed: May 12, 1995

[51] Int. Cl.$^6$ ........................ G03B 31/00; G03B 31/04; G03B 24/00
[52] U.S. Cl. .................... 352/6; 352/12; 352/31; 352/131
[58] Field of Search .................. 352/6, 31, 12, 352/131; 348/64

[56] References Cited

U.S. PATENT DOCUMENTS

| | | | |
|---|---|---|---|
| 2,796,799 | 6/1957 | Strauss | 352/131 |
| 3,224,829 | 12/1965 | Forster | 352/131 |
| 3,492,068 | 1/1970 | Baron | 352/12 |
| 3,575,552 | 4/1971 | Grant | 348/64 |
| 3,674,346 | 7/1972 | Lancor | 352/12 |
| 3,900,251 | 8/1975 | Doyle et al. | 352/12 |
| 3,918,801 | 11/1975 | Bauhofer | 352/72 |
| 3,926,511 | 12/1975 | Gendrot et al. | 352/5 |
| 4,148,072 | 4/1979 | Vockenhuber | 348/64 |
| 4,220,403 | 9/1980 | Chauvet | 352/17 |

*Primary Examiner*—Safet Metjahic
*Assistant Examiner*—Matthew Miller
*Attorney, Agent, or Firm*—Matthew F. Jodziewicz

[57] ABSTRACT

In a motion picture film/audio recording system where a camera produces a motion picture film, a corresponding video signal, and associates with both the motion picture film and video signal a first time code signal providing a correspondence standard between the motion picture film and the video signal, and a camera status signal representative of whether the camera is on or off, and a sound recorder which produces an audio signal, a second time code signal having a known relationship to the first time code signal, and a recorder status signal representative of whether the sound recorder is on or off, a viewing system for the motion picture film includes an interface module that receives the camera status signal and the recorder status signal, and generates a save signal whenever the camera status or the recorder status signals indicate that the camera or the recorder is on. A processor receives the save signal, the video signal, the audio signal and the first, second or independently generated third time code signals, and stores the video, audio and first, second or third time code signals in a storage medium for retrieval whenever the save signal is present for later retrieval and viewing.

23 Claims, 2 Drawing Sheets

SYSTEM FOR MOTION PICTURE FILM PREVIEWING

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates in general to pre-editing assembly systems, and, in particular, to a viewing system for use with motion picture film utilizing a video signal, audio signal and time code to assist in view and locating desired motion picture film footage.

2. Background of the Invention

When filming a movie, literally thousands of feet of expensive motion picture film is shot or exposed during the shooting process in scenes where actors portray their various characters and situations. While motion picture film is itself expensive, it is even more expensive to develop all of the film shot. Additionally, it takes a long period of time for the developed negatives to be available as "rushes" for review by the director. Thus, while thousands of feet of film are shot, only a small portion of the total film is actually available for viewing before a shooting schedule forces the director to move to other scenes, hoping that some of the seen or unseen film will be acceptable and usable in the final editing process. In fact, due to the cost of developing motion picture film, in many instances not all of the exposed film is even developed, leaving a portion of the exposed film undeveloped and therefore never even seen by anyone. Hidden in this exposed but undeveloped film may be useful and perhaps even better "takes" than those finally chosen that are lost forever.

The present invention incorporates existing video, audio (monaural and stereo) and time code signals found on motion picture cameras and sound recorders with computer technology to provide a video previewing system that permits an editor, director or any interested individual to preview a video signal that was produced simultaneously with the motion picture film that is representative of scenes on the corresponding motion picture film. Thus, the instantaneously available and cheaper video signal may be previewed to determine which of the many thousands of feet of exposed motion picture film should be developed and which should not be developed. This invention results in a time and cost savings in the production of a movie, as well as allowing the viewing of more potential scenes and "takes" by the director and editing personnel than was before possible.

OBJECTS AND SUMMARY OF THE INVENTION

Accordingly, it is an object of the present invention to provide an efficient and economical viewing system for motion picture film.

In general, the invention is embodied for use with a motion picture film/audio recording system where a camera produces a motion picture film, a corresponding video signal, a first time code signal, and a camera status signal representative of whether the camera is on or off, and a sound recorder which produces an audio signal, a second time code signal having a known relationship to the first time code signal, and a recorder status signal representative of whether the sound recorder is on or off. The system may also include a third independent time code generator "jamset" that is used to synchronize the time code generators in the camera and sound recorders ("'jammed' to the first or second time code signals") so that all three time code signals are related. This is done so that the individual units may be separated after being jammed for cableless use, giving the component users greater freedom of movement than that found where cables must interconnect the various components.)

A viewing system for motion picture film, embodying the present invention, comprises an interface command module which receives the camera status signal or the recorder status signal. The interface command module generates a save signal whenever the camera status or the recorder status signals indicate that the camera or the recorder is on. A processor, such as a central processing unit, receives the save signal, the video signal, the audio signal and the first, second or third time code signals. The processor stores the video, audio and first, second or third time code signals in a storage medium for retrieval whenever the save signal is present.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

Figure 1:
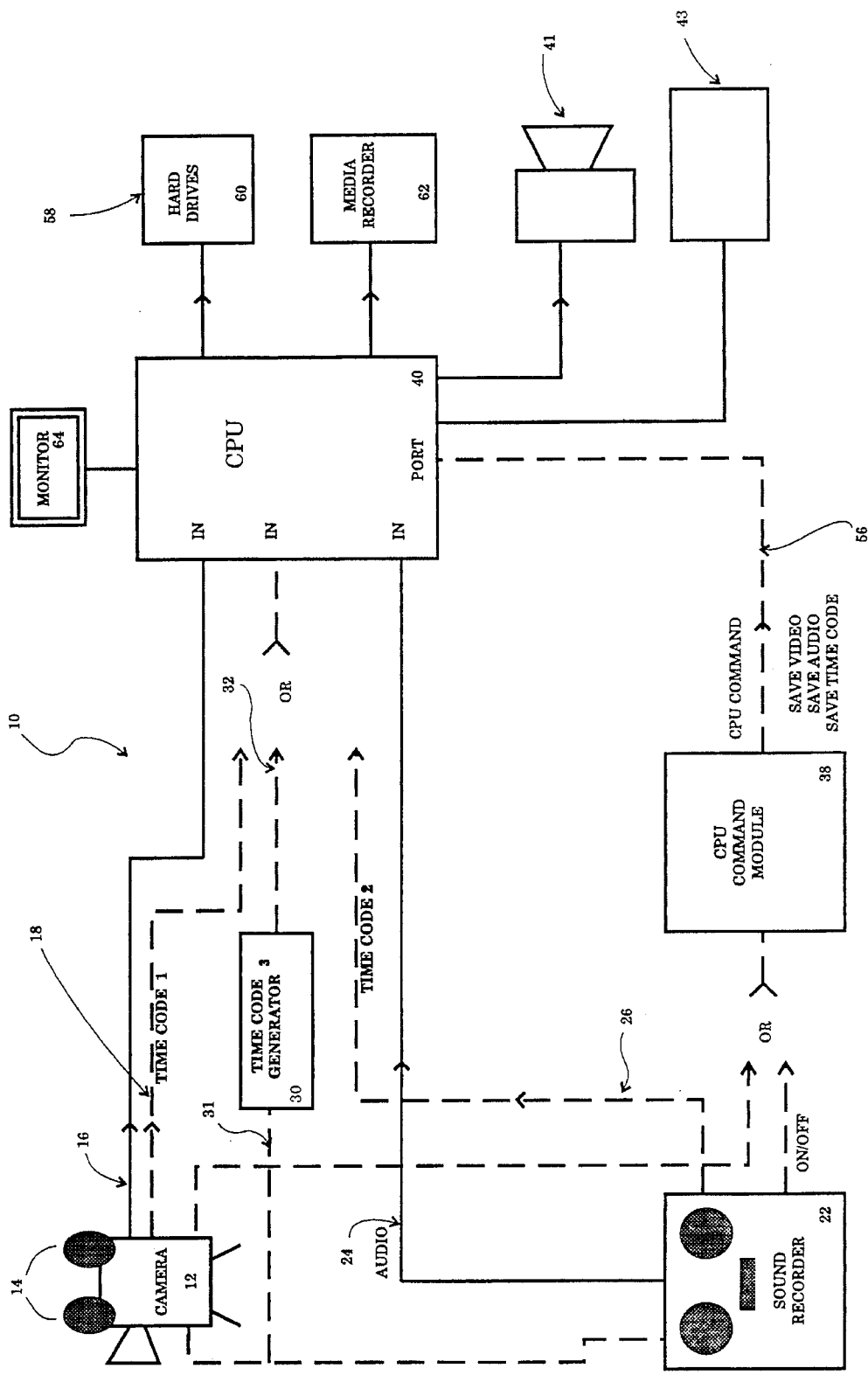
FIG. 1 is an idealized block schematic of a viewing system embodying the present invention; and, FIG. 2 is an idealized block schematic of a processor command module useful in a system embodying the present invention.

A preferred embodiment of a motion picture film viewing system constructed in accord with, and embodying the present invention, will now be described with reference to FIG. 1 and FIG. 2 in the drawings.

Generally, a modern motion picture film/audio recording system 10 incorporates a camera unit 12 that produce not only a motion picture film 14, but a corresponding video signal 16. Camera unit 12 also commonly produces an output signal 18 representing a time code that is useful as a correspondence standard or reference between the motion picture film 14 and the video signal 16 from the camera 12. This time code signal 18 is normally used for quickly locating a corresponding portion of the motion picture film 14 given a known reference time code point in the video signal 16, or vice versa. Finally, modern cameras also produce a camera status signal 20 representative of whether the camera unit 12 is active or not, i.e., on or off, for use in controlling or synchronizing other peripheral equipment, such as duration timers timing the length of the scene as shot and the like.

The audio recording portion of system 10 usually includes a sound recorder 22 which produces an audio signal 24, a time code signal 26 and a recorder status signal 28 representative of whether the sound recorder 22 is active or not, i.e., on or off, for use similar to that described above for camera unit 12. The time code signal 26 produced by sound recorder 22 normally has a known relationship to the time code signal 18 generated by the camera unit 12, so that the sound audio output signal 24 of the sound recorder 22 can be synchronized with the motion picture film 14 and video output signal 16 of the camera unit 12 for ease in locating corresponding points in all three media.

Many times an independent synchronizing source, such as a time code generator 30, is used to initiate or synchronize the time code signal generating circuitry in both the camera unit 12 and the sound recorder 22 by generating an independent time code signal 32. By synchronizing both the camera unit 12 and the sound recorder 22 to a common, independent time code reference 32, it is easier to find a common section of the motion picture film 14, video and sound recording signals, 16 and 24, respectively, by having reference to only one of the signals, as the time code reference 32 is the same for all of these signals.

In practice, the camera unit 12 and the sound recorder unit 22 are "jammed", i.e., connected, with the synchronizing source 30 using time code signal 32 to initiate or reset the time code signal generators in each of these units using communication link 31, which may be a wire cable, infrared or radio frequency communications link between these units. Once synchronized, the units are then separated and continue to generate their respective time code signals independently of one another, but the time code generators in each unit has sufficient accuracy that the time code signals remain generally synchronized for long periods of time.

A viewing system for the motion picture film 14 shot in such a modern system 10 that embodies the present invention includes an interface or command module 34 that receives the camera status signal 20 and/or the recorder status signal 28. The command module 34 generates a status save command signal 36 whenever the camera status or the recorder status signals, 20 and 28 respectively, indicate that the camera unit 12 or the sound recorder 22 is on or active. The status signals, 20 and 28, indicating whether or not the camera unit 12 or sound recorder 22 are active, is used to prevent storage of a blank signal which would otherwise waste useable storage media.

Preferably there is also a device 43 that is responsive to a user or operator of the camera or sound recording equipment for generating a manual save command signal. The manually generated signal provides greater flexibility for an operator or editor to respond to impromptu situations that may occur during filming or recording, allowing an individual to capture data into the storage medium associated with the processor as described in greater detail below.

Figure 2:
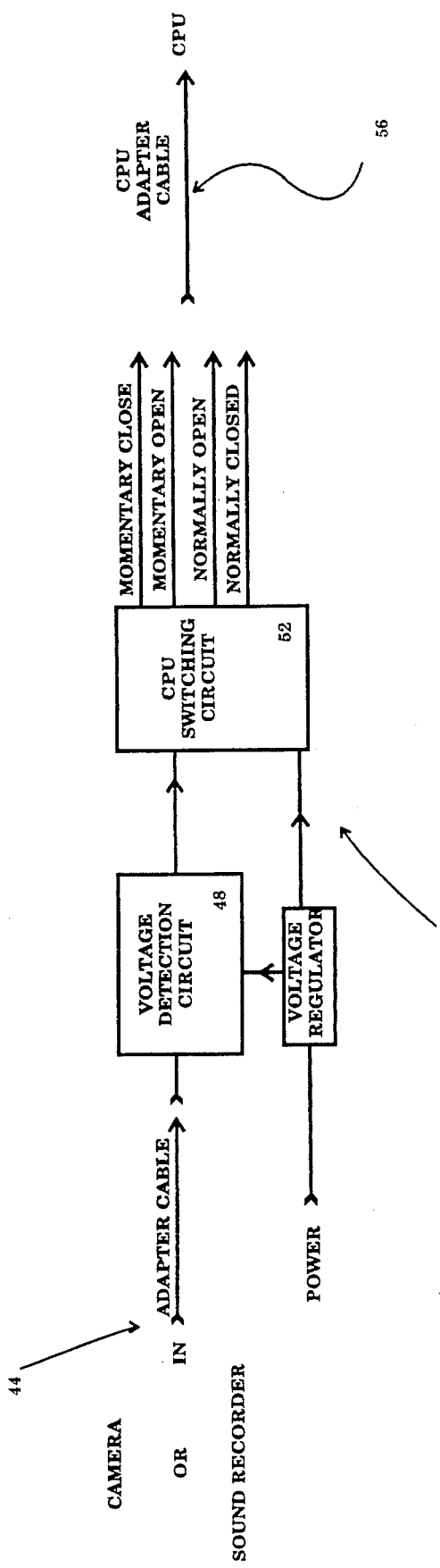

FIG. 2 shows a processor command module 38 that acts as a front end to a processor unit 40 and operates in the following manner. The command module 38 receives the camera unit and sound recorder status signals, 20 and 28 respectively, as an input and generates a save signal 42 whenever the camera status signal 20 or the sound recorder status signal 28 indicates that the camera unit 12 or the sound recorder 22 is active or on. In many instances the camera unit 12 and sound recorder 28 provide an output voltage 44 as a status signal when active. This output voltage 44 is connected to the module through an appropriate cable 46. Voltage detection circuitry 48 in command module 38 detects the various voltages applied to it through the cable 46 input and generates a control signal 50 that turns the processor switching circuitry 52 on whenever the voltage signal 44 is detected and, when the voltage signal 44 is not detected, it would modify the control signal 50 to turn the processor switching circuitry 52 off.

The processor switching circuitry 52 contains various switching outputs 54 for interfacing with different types of processors. The most common types of switching outputs would include: momentary close; momentary open; normally open; and, normally closed.

The processor switching circuitry 52 is connected to the processor 40 with an appropriate cable 56 and generates a status save signal 36 and applies that signal to the processor 40 for use by processor 40 in determining when and what to store as described below.

Processor 40 receives the status 36 (and manual save) signals, the video signal 16, the audio signal 24 and the time code signals from the camera, sound recorder and independent time code generator, signals 18, 26 and 32 respectively. The processor 40 stores the video, audio and time code signals 18, 26 and 32 respectively, in a storage medium 58 for retrieval whenever the status save command signal 36 (or the manual save command signal) is detected or present. Preferably storage media 58 include hard drives 60, optical discs or a media recorder 62, or any other type of accessible electronic or optical storage media capable of storing the large amounts of data necessary for image retention.

It is also preferred that the processor 40 be associated with a display device 64 for displaying the video signal 16 received from the camera unit 12 either real time or for later processing by an editor from image data retrieved from storage 58. Preferable display devices include computer display monitors, television monitors or even projectors.

Likewise, a speaker 41 is preferably connected to the processor 40 for generating an audible signal representative of the audio signal 24 received from the sound recorder 22.

In previewing the stored audio or visual signals, a user can manipulate the stored data as digital signals to achieve any desired effect by using known digital data processing methods to mix, match or even substitute new audio or video signals for those originally stored, creating various special effects so commonly seen in today's movies or television shows.

Likewise, either the video or audio signals can be stored time independent of one another so that, for a non-limiting example, an audio track may be added to a previously recorded video signal at a later date, and vice versa.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. In a motion picture film/audio recording system where a camera produces a motion picture film, a corresponding video signal, and associates with both the motion picture film and video signal a first time code signal providing a correspondence standard between the motion picture film and the video signal, and a camera status signal representative of whether the camera is on or off, and a sound recorder which produces an audio signal, a second time code signal having a known relationship to the first time code signal, and a recorder status signal representative of whether the sound recorder is on or off, a viewing system for the motion picture film comprising:

command module means, receiving the camera status signal and the recorder status signal, for generating a save signal whenever the camera status or the recorder status signals indicate that the camera or the recorder is on; and, processor means, receiving said save signal, the video signal, the audio signal and the first and second time code signals, for storing the video, audio and first and second time code signals in a storage medium for retrieval whenever said save signal is received.

2. A viewing system as in claim 1 wherein said processor means further includes means for displaying the video signal received from the camera.

3. A viewing system as in claim 2 wherein said means for displaying the video signal received from the camera comprises a video display monitor.

4. A viewing system as in claim 2 wherein said means for displaying the video signal received from the camera comprises a television monitor.

5. A viewing system as in claim 2 wherein said means for displaying the video signal received from the camera comprises a projector.

6. A viewing system as in claim 1 wherein said processor means further includes speaker means for generating an audible signal representative of the audio signal received from the sound recorder.

7. A viewing system as in claim 1 further including:

means responsive to a user for generating a manual save command signal; and, said processor means is adapted to receive said manual save command signal and for storing the video, audio and first and second time code signals in a storage medium for retrieval whenever said manual save command signal is received.

8. A viewing system as in claim 1 further including:

means for generating a third time code signal;

means for synchronizing the first and second time code signals with said third time code signal as a reference standard, said processor means adapted to receive and store said third time code signal in said storage medium whenever said save signal is received.

9. A viewing system as in claim 8 wherein said third time code generating means is a time code generator.

10. A viewing system as in claim 8 wherein said means for synchronizing the first and second time code signals with said third time code signal as a reference standard comprises at least one cable connecting said third code generating means with the camera or the sound recorder.

11. A viewing system as in claim 8 wherein said means for synchronizing the first and second time code signals with said third time code signal as a reference standard comprises a radio frequency link connecting said third code generating means with the camera or the sound recorder.

12. A viewing system as in claim 8 wherein said means for synchronizing the first and second time code signals with said third time code signal as a reference standard comprises an infra-red link connecting said third code generating means with the camera or the sound recorder.

13. In a motion picture film/audio recording system where a camera produces a motion picture film, a corresponding video signal, and associates with both the motion picture film and video signal a first time code signal providing a correspondence standard between the motion picture film and the video signal, and a camera status signal representative of whether the camera is on or off, and a sound recorder which produces an audio signal, a second time code signal having a known relationship to the first time code signal, and a recorder status signal representative of whether the sound recorder is on or off, a viewing system for the motion picture film comprising:

command module means, receiving the camera status signal and the recorder status signal, for generating a status save command signal whenever the camera status or the recorder status signals indicate that the camera or the recorder is on;

means responsive to a user for generating a manual save command signal;

means for generating a third time code signal;

means for synchronizing the first and second time code signals with said third time code signal as a reference standard;

processor means, receiving said status and said manual save signals, the video signal, the audio signal and the first and second time code signals, and said third time code signal, for storing the video, audio and first and second time code signals and said third time code signal, in a storage medium for retrieval whenever said status save command signal or said manual save command signal is received;

means, connected to said processor means, for displaying the video signal received from the camera;

speaker means, connected to said processor means, for generating an audible signal representative of the audio signal received from the sound recorder.

14. A viewing system as in claim 13 wherein said means for displaying the video signal received from the camera comprises a video display monitor.

15. A viewing system as in claim 13 wherein said means for displaying the video signal received from the camera comprises a television monitor.

16. A viewing system as in claim 13 wherein said means for displaying the video signal received from the camera comprises a projector.

17. A viewing system as in claim 13 wherein said third time code generating means is a time code generator.

18. A viewing system as in claim 13 wherein said means for synchronizing the first and second time code signals with said third time code signal as a reference standard comprises at least one cable connecting said third code generating means with the camera or the sound recorder.

19. A viewing system as in claim 13 wherein said means for synchronizing the first and second time code signals with said third time code signal as a reference standard comprises a radio frequency link connecting said third code generating means with the camera or the sound recorder.

20. A viewing system as in claim 13 wherein said means for synchronizing the first and second time code signals with said third time code signal as a reference standard comprises an infra-red link connecting said third code generating means with the camera or the sound recorder.

21. In a motion picture film/audio recording system where a camera produces a motion picture film, a corresponding video signal, and associates with both the motion picture film and video signal a first time code signal providing a correspondence standard between the motion picture film and the video signal, and a camera status signal representative of whether the camera is on or off, and a sound recorder which produces an audio signal, a second time code signal having a known relationship to the first time code signal, and a recorder status signal representative of whether the sound recorder is on or off, a method for locating and viewing the motion picture film comprising the steps of:

receiving the camera status signal and the recorder status signal, and generating a save signal whenever the camera status or the recorder status signals indicate that the camera or the recorder is on; and, receiving said save signal, the video signal, the audio signal and the first and second time code signals, and storing the video, audio and first and second time code signals in a storage medium for retrieval whenever said save signal is received.

22. A method as in claim 21 further including the steps of:

generating a manual save command signal; and, receiving said manual save command signal and storing the video, audio and first and second time code signals in a storage medium for retrieval whenever said manual save command signal is received.

23. A viewing system as in claim 21 further including the steps of:

generating a third time code signal independently of the first and second time code signals;

synchronizing the first and second time code signals with said third time code signal as a reference standard; and, receiving and storing said third time code signal in said storage medium whenever said save signal is received.

\* \* \* \* \*

US005594513C1

(12) REEXAMINATION CERTIFICATE (4627th)
United States Patent
Stone et al.

(10) Number: US 5,594,513 C1
(45) Certificate Issued: Aug. 13, 2002

(54) SYSTEM FOR MOTION PICTURE FILM PREVIEWING

(75) Inventors: Neil T. Stone, Chatsworth, CA (US); Jacques Nosco, 5805 Salisbury La., San Luis Obispo, CA (US) 93401

(73) Assignee: Jacques Nosco, Thousand Oaks, CA (US)

Reexamination Request:
No. 90/006,066, Jul. 20, 2001

Reexamination Certificate for:
Patent No.: 5,594,513
Issued: Jan. 14, 1997
Appl. No.: 08/440,342
Filed: May 12, 1995

(51) Int. Cl.$^7$ .................. G03B 31/00; G03B 31/04; G03B 24/00
(52) U.S. Cl. .................. 352/6; 352/12; 352/31; 352/131
(58) Field of Search .................. 352/6, 12, 31, 352/131; 348/64

(56) References Cited

PUBLICATIONS

Nov. 21, 1989, Schematics for Panavision's "Combo 8" System.
Jan. 5, 1990, Schematics and Specifications for Panavision's "Panathang/Pana Cart" System.
Jul./Aug. 1994, "ON Production and Post–Production" magazine, pp. 56–61.
Jun. 3, 1986, Speech of Rolf Müller.
Mid–1980's, ARRI Brochure.
Oct. 1993, International Documentary, "Film Time Code: A User–Friendly Overview" by John Bishop.

Primary Examiner—Russell E Adams

(57) ABSTRACT

In a motion picture film/audio recording system where a camera produces a motion picture film, a corresponding video signal, and associates with both the motion picture film and video signal a first time code signal providing a correspondence standard between the motion picture film and the video signal, and a camera status signal representative of whether the camera is on or off, and a sound recorder which produces an audio signal, a second time code signal having a known relationship to the first time code signal, and a recorder status signal representative of whether the sound recorder is on or off, a viewing system for the motion picture film includes an interface module that receives the camera status signal and the recorder status signal, and generates a save signal whenever the camera status or the recorder status signals indicate that the camera or the recorder is on. A processor receives the save signal, the video signal, the audio signal and the first, second or independently generated third time code signals, and stores the video, audio and first, second or third time code signals in a storage medium for retrieval whenever the save signal is present for later retrieval and viewing.

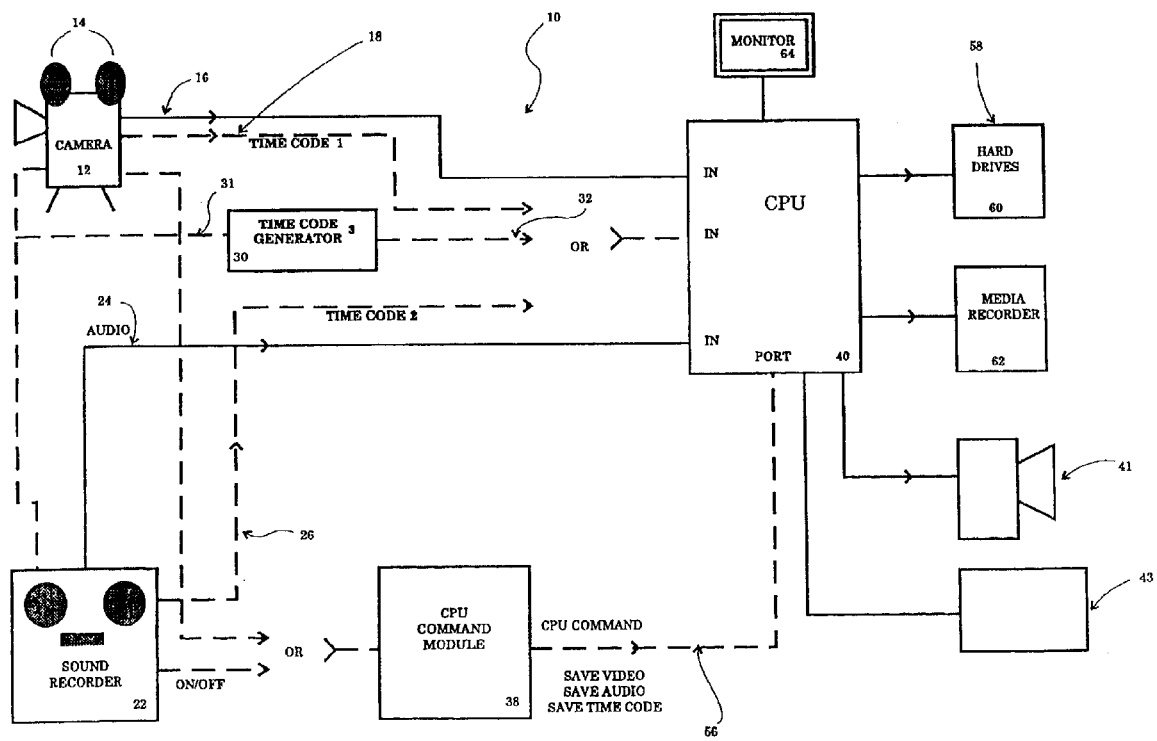

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *